United States Patent [19]

Donelan et al.

[11] 4,003,256
[45] Jan. 18, 1977

[54] ACOUSTIC OSCILLATOR FLUID VELOCITY MEASURING DEVICE

[75] Inventors: A. Mark Donelan; Bryan F. White, both of Burlington, Canada

[73] Assignee: Canadian Patents and Development Limited, Ottawa, Canada

[22] Filed: Nov. 17, 1975

[21] Appl. No.: 632,802

[52] U.S. Cl. ............................................. 73/194 A
[51] Int. Cl.² ......................................... G01F 1/66
[58] Field of Search ................ 73/194 A, 560, 67.6

[56] References Cited

UNITED STATES PATENTS

| | | | |
|---|---|---|---|
| 2,826,912 | 3/1958 | Kritz | 73/194 A |
| 3,420,102 | 1/1969 | Brown | 73/194 A |
| 3,697,936 | 10/1972 | Zacharias, Jr. et al. | 73/194 A X |
| 3,720,105 | 3/1973 | Cirulis | 73/194 A |
| 3,751,979 | 8/1973 | Ims | 73/194 A |

Primary Examiner—Charles A. Ruehl
Attorney, Agent, or Firm—Edward Rymek

[57] ABSTRACT

A fluid velocity measuring device for the accurate fast measurement of the velocity of a fluid whether liquid or gas using the time of passage of acoustic energy through the fluid as the frequency determining element in a continuous wave oscillator. The frequencies or periods of oscillations of two anti-parallel acoustic paths are used to compute fluid velocity between the electro-acoustic transducers at the ends of the acoustic paths. The device in accordance with this invention may utilize a single reversing acoustic path or two anti-parallel acoustic paths. The velocity resolution can be selected by the operator in accordance with a stated uncertainty principle limiting the ratio of frequency response to velocity resolution. Mode ambiguities due to fluid phase velocity variations are avoided by varying the path lengths. The frequency range of the oscillator is limited by a phase locked loop.

3 Claims, 8 Drawing Figures

ACOUSTIC OSCILLATOR FLUID VELOCITY MEASURING DEVICE

This invention is directed to a fluid motion or velocity measuring system and in particular to an ultrasonic system which transmits continuous wave ultrasonic energy in the direction of the fluid motion and against the fluid motion.

A number of different approaches exist for sensing and measuring the motion of fluids. A particular subset of these have given rise to devices which sense the fluid motion by the means of propagating acoustic energy in the fluid. The physics of the measurement approaches characterize the different types of devices: doppler shift, propagation time, and phase shifts have been successfully implemented. Doppler devices scatter acoustic energy off reflecting particles and/or variations in the local acoustic impedance of the fluid. The frequency shift of the scattered energy relative to the transmitted energy is the measure of fluid velocity.

Propagation time devices are largely variants of the technique used in the "sing-around velocimeter" described in the publication "The sing-around velocimeter and its use in measuring the size of turbulent eddies in the sea" Dunn, D. J. Electronic Engineering, 37, 449, pp 432–6, July 1965. These devices sense the time difference required for bursts of acoustic energy to traverse anti-parallel paths. This time difference is the measure of the fluid velocity over the path. By designing the device so as to retransmit the acoustic burst from the transmitter when it is detected at the receiver, it is possible to make the frequency of repetition of transmission, sing-around frequency, a convenient measure of the fluid motion.

Phase shift devices sense the fluid motion by measuring the relative phase shifts of the acoustic waveform received by an array of receivers spaced about an omnidirectional continuous wave transmitter, as described in U.S. Pat. No. 3,861,211 - Dewan, which issued Jan. 21, 1975.

It is therefore an object of this invention to provide a novel fluid motion or velocity measuring device.

It is a further object of the invention to provide a fluid velocity measuring device in which resolution and frequency response are selectable.

It is another object of this invention to provide a fluid velocity meauring device having an improved sensitivity.

It is a further object of this invention to provide a fluid velocity measuring device for measuring the velocity of fluids such as liquids or gases.

It is another object of this invention to provide a fluid velocity measuring device capable of compensating for signal delays caused by the circuitry of the monitor.

It is a further object of this invention to provide a fluid velocity measuring device capable of compensating for changes in the phase velocity of the fluid under consideration.

These and other objects are achieved in a device for measuring the motion or velocity of a fluid such as a liquid or a gas which includes free running continuous wave acoustic oscillator means for propagating acoustic energy in the fluid along paths defined by the instrument. Acoustic energy may be propagated simultaneously along two anti-parallel acoustic paths or along a single periodically reversing path. The oscillator means includes at least one oscillating circuit having a first acoustic transducer and a second acoustic transducer with the acoustic path therebetween forming the frequency determining element of the circuit. The frequency of oscillation is therefore directly related to the motion of the fluid between the transducers. In order to limit the frequency range of the oscillator means, it may further include a phase locked loop. To compensate for phase velocity shift of the fluid, the transducers may be mounted relative to one another such that the acoustic path length between them will vary with the parameters affecting fluid phase velocity, such as temperature and pressure.

Fluid motion is determined by computing the difference frequency between the acoustic path in the direction of fluid flow and in the direction against fluid flow. To achieve greater accuracy, the difference of the periods of oscillation which have been compensated for signal delays in the circuitry, may be used to determine fluid motion.

Figure 1:
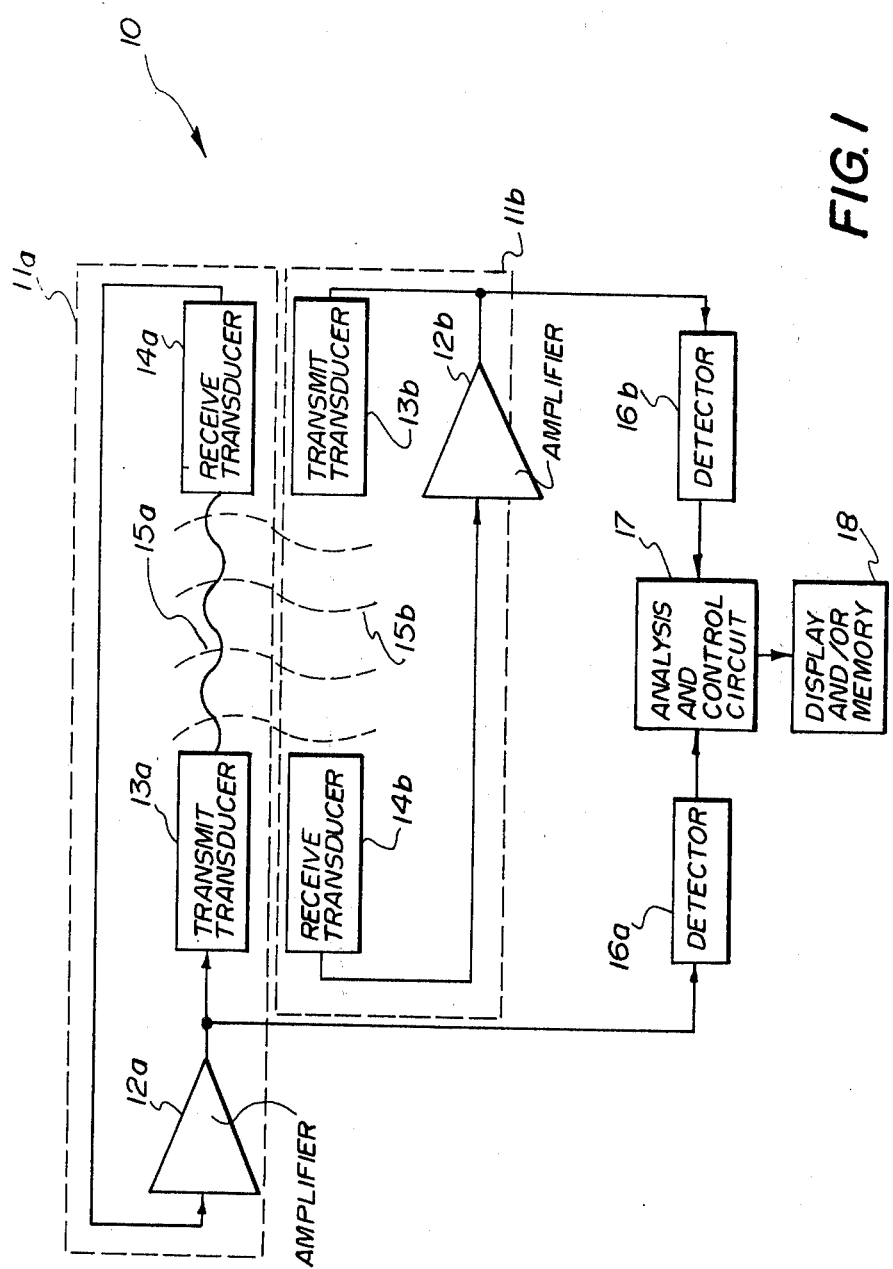
FIG. 1 illustrates a two oscillator circuit fluid velocity measuring device.

A block diagram of the fluid velocity measuring device is shown in FIG. 1. The system 10 as illustrated includes a pair of identical oscillating circuits 11a and 11b. Oscillator 11a includes an amplifier 12a with its output coupled to a transmitting acoustic transducer 13a and its input coupled to a receiving acoustic transducer 14a. The transducers 13a and 14a are spaced apart so as to form an acoustic path 15a therebetween. This acoustic path 15a acts as the frequency determining element in the electro-acoustic continuous wave, free running oscillator 11a. Fluid velocity along the acoustic energy path 15a changes the time delay and hence the resonant frequency of oscillator 11a. Amplifier 12a supplies gain A in an Automatic Gain Control fashion to compensate for transmission losses in the acoustic path 15a and for the inefficiency of transducers 13a and 14a. Amplifier 12a may further include a phase locked loop to control the electronic bandwith. An example of such a phase-locked loop control is described with respect to FIG. 3. A detector 16a is coupled to oscillator 11a at either of the transducers 13a or 14a to detect the output signal of the oscillator 11a.

Oscillator 11b, which is identical to oscillator 11a, includes an amplifier 12b, transmit and receive acoustic transducers 13b and 14b spaced as to form an acoustic path 15b. In addition a detector 16b is coupled to oscillator 11b.

In order to sense the motion of a fluid, the effect of the fluid motion on the propagation of acoustic energy in the fluid is monitored. This is done by positioning the transducers 13a – 14a and 13b – 14b in the fluid such that paths 15a and 15b are antiparallel. The oscillator signals for the two paths 15a and 15b are detected by detectors 16a and 16b respectively which are coupled to an analysis and control circuit 17. Embodiments of circuit 17 are described with respect to FIGS. 4 and 6. Circuit 17 determines the frequency difference or the period difference of oscillators 11a and 11b over a suitable time period from which fluid motion or velocity is determined. The fluid velocity or motion is then displayed and/or stored in a display and/or memory circuit 18.

Figure 2:
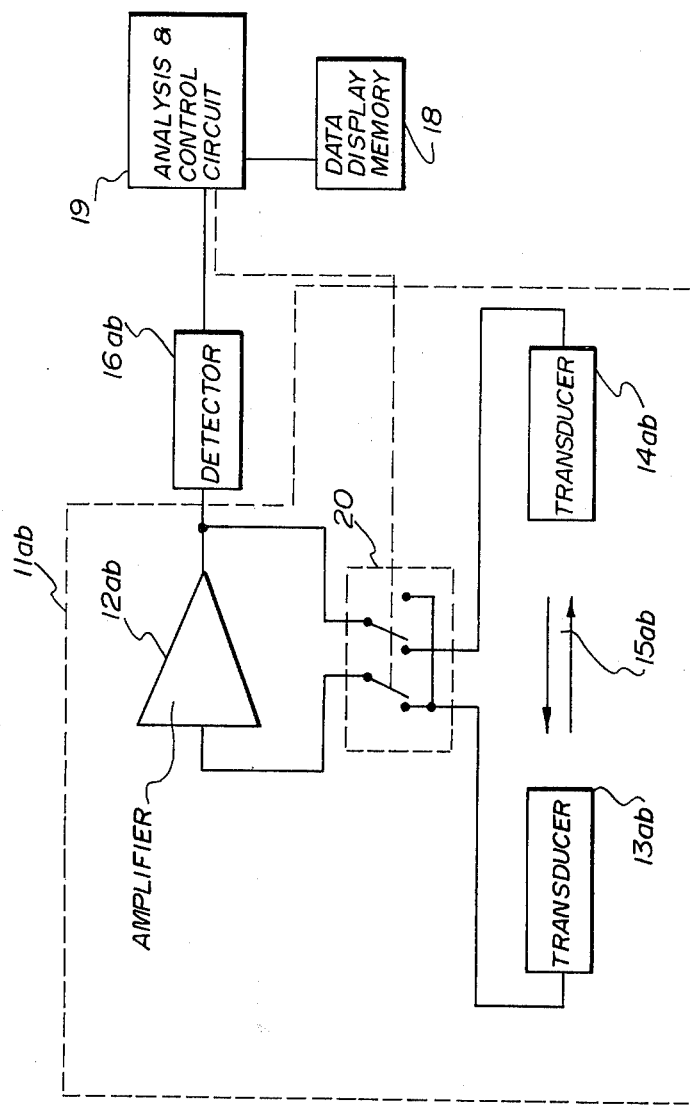
FIG. 2 illustrates a one oscillator circuit fluid velocity measuring device.

Through two antiparallel acoustic paths 15a and 15b are shown in FIG. 1, a fluid motion measuring device in accordance with this invention may have a single periodically reversing acoustic path. In such a measuring device which is illustrated in FIG. 2, a single oscillator 11ab having two spaced acoustic transducers 13ab and 14ab, also includes a switching circuit 20 which periodically reverses the direction of acoustic energy propagation along path 15ab. The oscillator signal is detected by a detector 16ab, processed by an analysis and control circuit 19 and the fluid velocity data is fed to the data display and/or memory 18. Embodiments of circuit 19 are described with respect to FIGS. 5 and 7.

The fundamental frequency of oscillation for the free running oscillator 11a, 11b or 11ab would be inconveniently low for many applications — giving low sensitivity as well as complicating the application of the device due to the external acoustics problem. Hence, it is useful to operate the oscillators at a known harmonic of the fundamental for the path. The ratio of the harmonic frequency to the fundamental is the mode number. To successfully discriminate against adjacent modes, and to guard against ambiguity of mode number due to changes in the phase velocity of the fluid, the use of mechanical amplification schemes to vary the acoustic path lengths with the parameters affecting the fluid phase velocity over the ranges is desired. In the case of a water flow sensor, the device would incorporate temperature corrections for the path length. One such mechanical amplification device is described with respect to FIG. 8.

A theoretical requirement for the design of the device is that the delay associated with the electronic portion of the oscillator should be very much smaller than the delay associated with the acoustic path. This is necessary to keep the dependence of the sensed velocity on the fluid phase velocity small. This requirement transforms to means that the frequency response of the electronic portion should be characterised by a large bandwidth. In the case of a water flow sensor, the possibility of the device operating at a sum of modes is of concern. Having corrected the phase velocity shifting problem above, it is necessary to electronically limit the frequencies of oscillations without the associated time delay for an equivalent filter. This may be accomplished by making the device a phase locked loop oscillator to be described with respect to FIG. 3.

Figure 3:
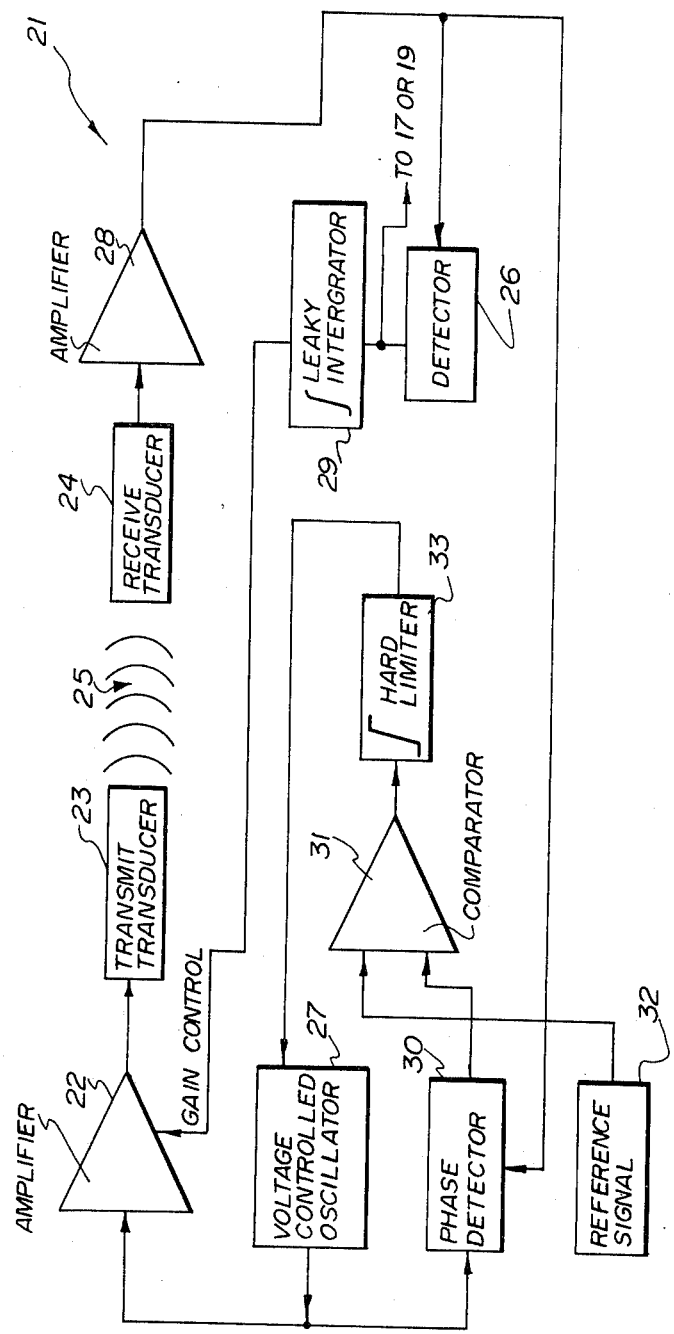
FIG. 3 illustrates a phase-locked loop oscillator.

FIG. 3 illustrates one possible embodiment of a phase-locked loop frequency controlled continuous wave oscillator 21 which may be used with the fluid velocity measuring device in accordance with this invention. Oscillator 21 includes spaced transmit and receive acoustic transducers 23 and 24 having an acoustic path 25 therebetween. An oscillating signal from a precision voltage controlled oscillator 27 is fed to the transducer 23 through a controlled gain amplifier 22 such that transducer 23 transmits continuous wave acoustic energy along path 25 to receive transducer 24. Transducer 24 is coupled to a signal detector 26 via a fixed gain amplifier 28. The output of detector 26 which is used in the analysis and control circuit 17 (FIG. 1) or 19 (FIG. 2), is also fed to a leaky integrator 29, the output of which provides the gain control signal for amplifier 22. The outputs from amplifier 28 and VCO 27 are also coupled to the two inputs of phase detector 30 which provides an output error signal proportional to phase difference between the two input signals. The error signal is fed to a comparator 31 where it is compared to a reference signal from a fixed voltage source 32 to produce a servo signal which is fed to VCO 27 to control the VCO frequency. However, the servo signal from comparator 31 may additionally be limited at its upper and lower bounds by a limiter 33 to effectively limit the operating frequency range of VCO 27 without adversely affecting the tracking rate of the oscillator 27 to changes in the acoustic path.

Figure 4:
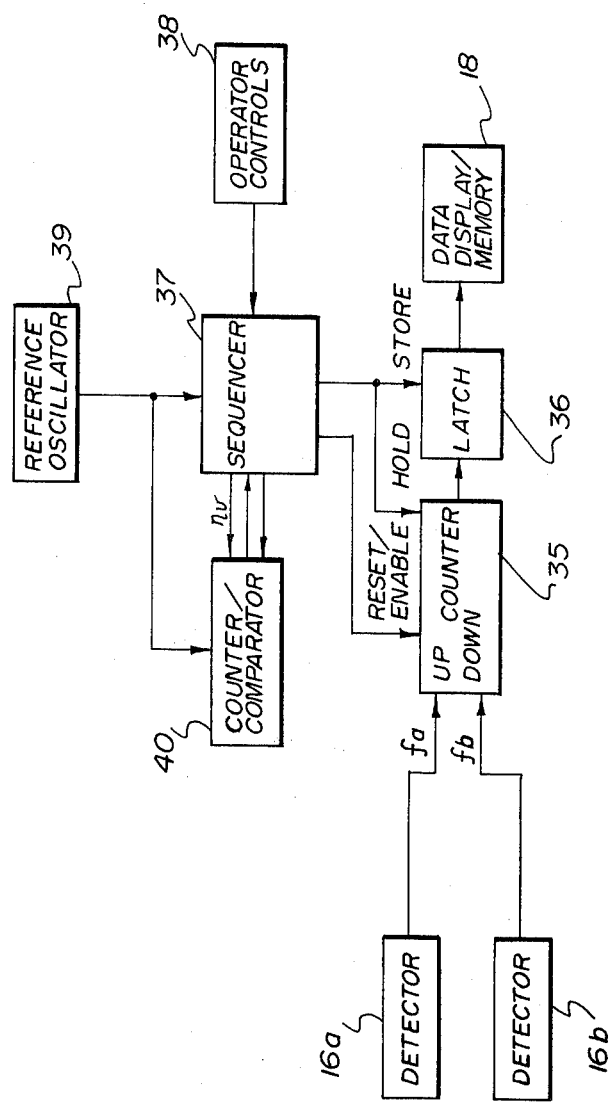
FIG. 4 illustrates a first analysis and control circuit for the measuring device in FIG. 1.
Figure 5:
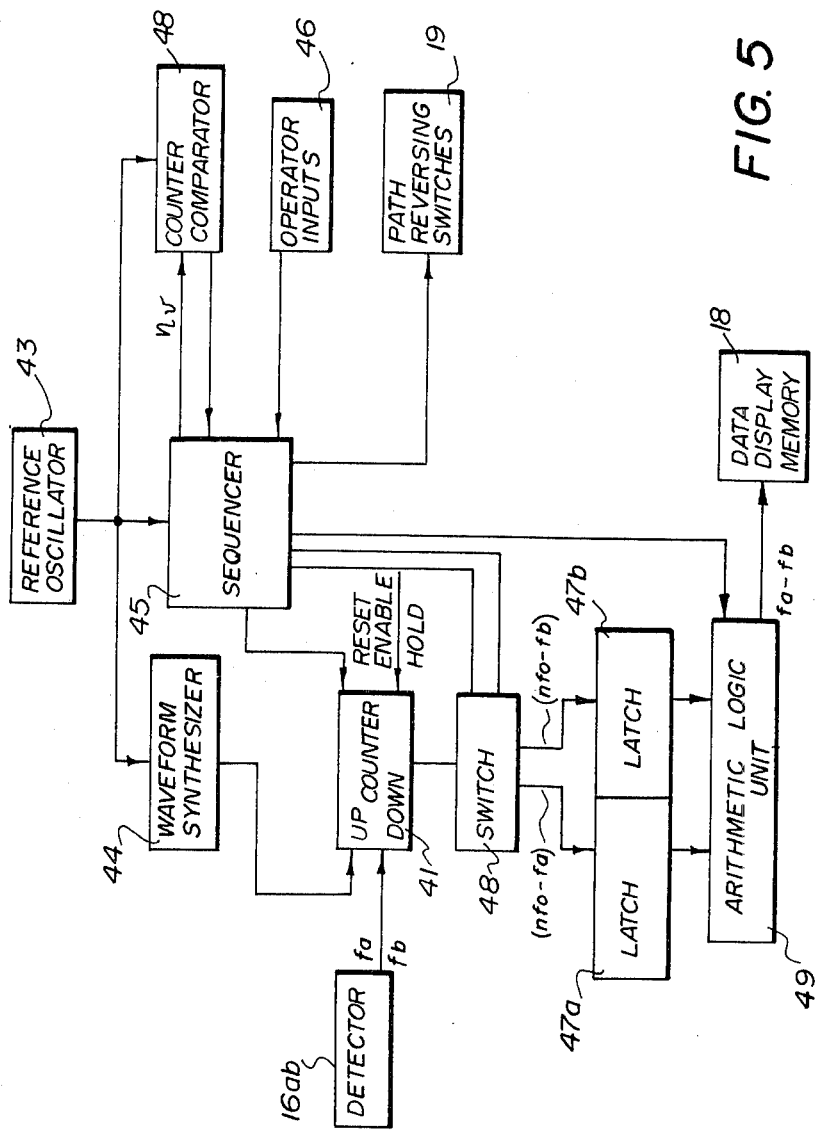
FIG. 5 illustrates a first analysis and control circuit for the measuring device in FIG. 2.
Figure 6:
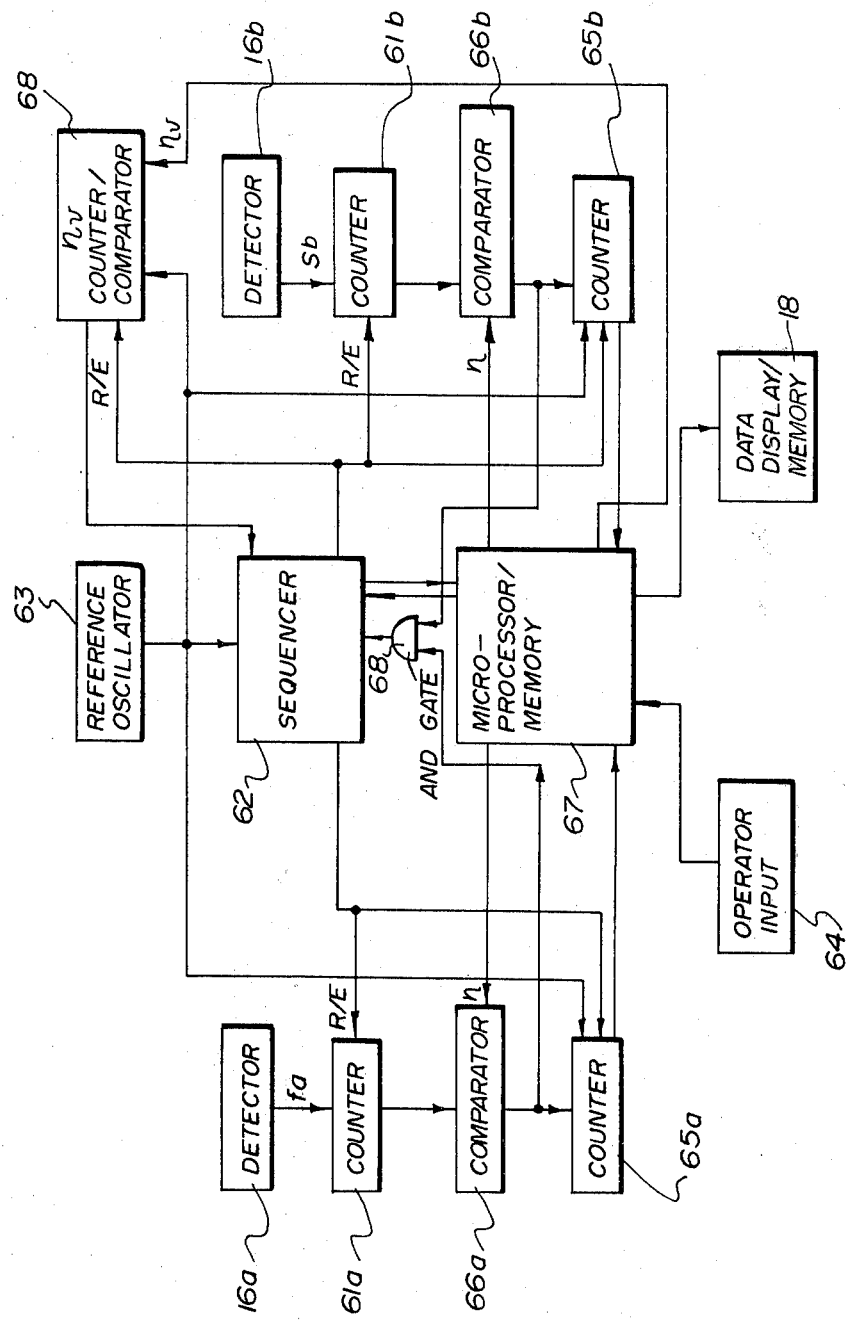
FIG. 6 illustrates a second analysis and control circuit for the measuring device in FIG. 1.
Figures 7, 8:
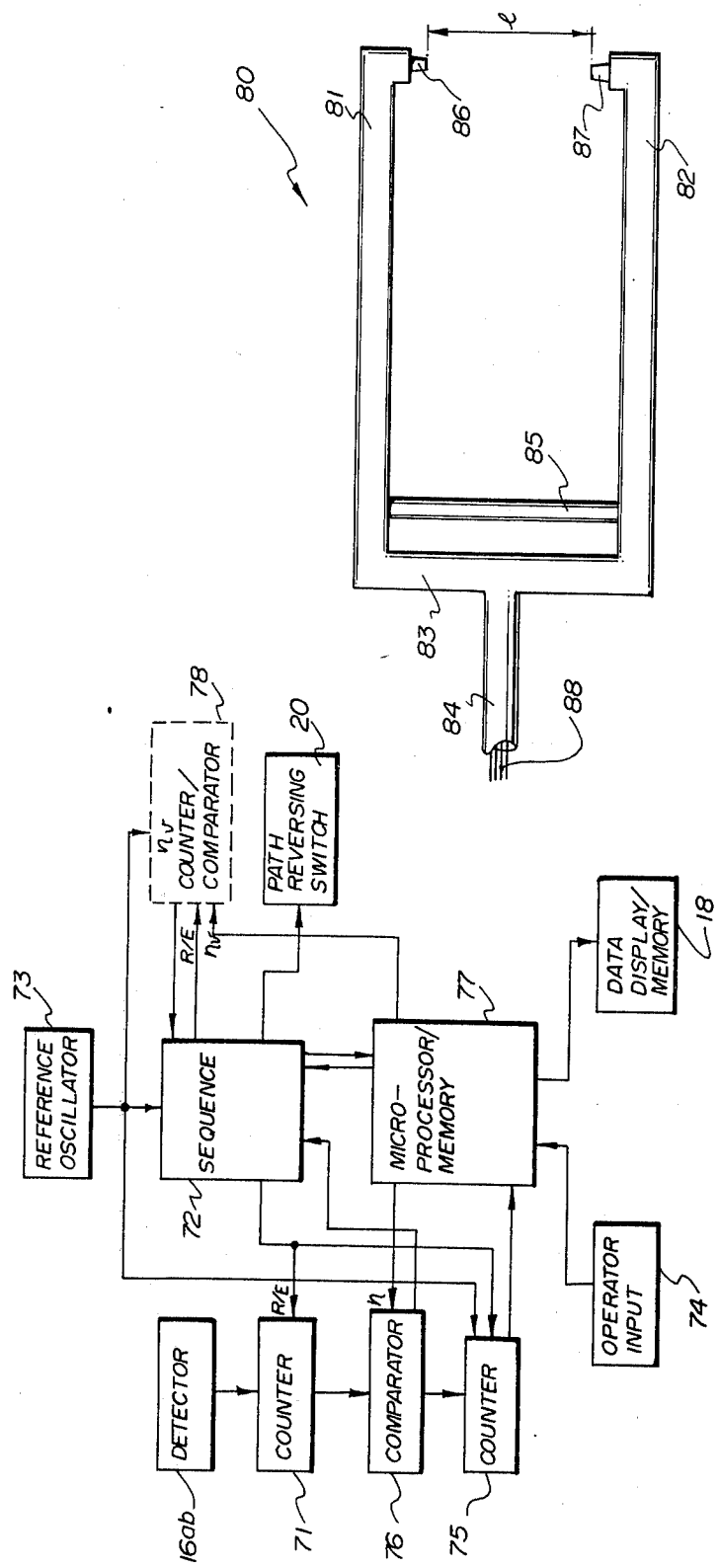
FIG. 7 illustrates a second analysis and control circuit for the measuring device in FIG. 2.
FIG. 8 illustrates a support of the structure for the transducers.

The analysis and control circuits 17 and 19 in FIGS. 1 and 2 respectively, basically determine the difference or beat frequency between the resonant frequencies of the acoustic energy propagation upstream in the direction of fluid motion and downstream in the direction opposite to fluid motion. Two basic concepts of analysis and control circuits are shown in FIGS. 4 and 5, and in FIGS. 6 and 7 respectively. The circuits 17 and 19 in FIGS. 4 and 5 respectively determine the difference frequency between upstream and downstream resonant frequencies for a two-antiparallel paths device (FIG. 1) and a single reversing path device (FIG. 2) respectively, as a measure of fluid velocity. The circuits 17 and 19 in FIGS. 6 and 7 respectively, which provide for greater precision, determine the period of resonance of each path and substract the time delay due to the circuitry from the period of resonance. The times required for acoustic energy to traverse the fluid paths upstream and downstream are then converted to frequencies, the difference of which provides the measure of fluid velocity. The circuit in FIG. 6 is used in a two anti-parallel path monitor (FIG. 1) and the circuit in FIG. 7 is used in a single reversing path monitor (FIG. 2).

Referring to FIG. 4, the resonant frequency signals of the two antiparallel path oscillators 11a and 11b (FIG. 1) are received by detectors 16a and 16b which preferably include waveform shaping and threshold circuits with hysterisis set to reduce the possibility of adjacent mode oscillations affecting the frequency count. The square wave trains of frequencies $f_1$ and $f_b$ from detectors 16a and 16b are coupled to an up/down counter 35 from which the difference count, after a preset interval, is extracted by latch 36, and transferred to the data display or memory circuit 18. The preset interval is programmed into a sequencer 37, by an operator control 38 through a counter comparator 40, in terms of a number of periods $n_p$ of a stable accurate reference oscillator 39. At the end of each interval the up/down counter 35 output is stored in the latch 36 and the counter 35 is reset and enabled for the next measurement. In the case where the flow direction is not known a priori, the counter 35 is reset with some fixed output count chosen by operator control so that the up/down counter does not saturate during any measurement interval. The output of the counter 35 at the end of each sampling interval may be passed immediately to the data display 18 or stored in the latch 36 for access on demand from the data display or memory 18.

Referring to FIG. 5, the resonant frequency signals of the single reversing path oscillator 11ab (FIG. 2) are received by detector 16ab which also preferably includes a waveform shaping and threshold circuit with hysteresis set to reduce the possibility of adjacent mode oscillations affecting the frequency count. The output from detector 16ab therefore consists of a succession of square wave signals alternately having a frequency $f_a$ or $f_b$, the duration of each depending on the path reversal time. The detector 16ab output is fed to the "down" input terminal of the up/down counter 41. A square wave signal of frequency $nf_o$ which is generated by a stable and accurate and oscillator 43 and shaped by a waveshaping circuit 44, is fed to the "up" input terminal of the up/down counter 41. The frequency of the reference oscillator 43 is set such that $f_a$ and $f_b$ are both always less than $nf_o$ for any flow conditions under measurement. A sequencer 45 is utilized to control all of the operation of the instrument as programmed by the operator input 46 are timed by the reference oscillator 43. Sequencer 45 controls the path reversal switches 20 of single path reversing oscillator 11ab as well as the signal processing circuits which include a first latch ciruit 47a for storing the count from counter 41 for the signal $f_a$, and a second latch circuit 47b for storing the count from counter 41 for the signal $f_b$. The counts are fed to the latching circuits through a sequencer 45 controlled switch 48. After a fixed period, the counts in latches 47a and 47b are transferred to an arithmetic logic unit 49 which takes the difference between the counts in latches 47b and 47a, which are $(nf_o-f_b)$ and $(nf_o-f_a)$ respectively. This difference which is $(f_a-f_b)$ is either stored therein or transferred to the data display and/or memory 18. The sequence of operations initiated by the sequencer 45 is as follows: at the end of the sampling interval in which path 15a is oscillating, the $a$ cycle, the output count of the up/down counter is fed to latch 47a and held, latch 47b contains the count from the previous $b$ cycle; the path of acoustic energy is reversed from 15a to 15b; counts from latch 47a and latch 47b, are passed to the arithmetic logic unit (ALU) 49 and the difference is determined and stored; there is a short delay to allow the oscillation in the path 15b to stabilize; the output of the up/down counter 41 is switched to latch 47b, reset to zero, and enabled; after the preset sampling interval the output of the up/down counter is fed to latch 47b and held; the path of acoustic energy is reversed from 15b to 15a the counts from latch 47a and latch 47b are passed to the ALU 49 and the difference is determined and stored; there is a short delay to allow the oscillation of the path 15a to stabilize; the output of the up/down counter 41 is switched to latch 47a, reset to zero, and enabled. This cycle is repeated continually. The output of ALU 49 may be transferred immediately to the data display and/or memory 18 or transferred on demand by the display or memory 18.

The above described analysis and control circuits simply subtract the upstream and downstream resonant frequencies which provides for an accuracy which is acceptable for most application. However the frequency difference obtained in this manner is not exactly proportional to the fluid velocity since the errors due to phase velocity variations and introduced by the time delays of the oscillator circuitry have not been eliminated. These are eliminated by the analysis and control circuits described with respect to FIGS. 6 and 7.

Referring to FIG. 6, the resonant frequency signal of the two antiparallel path oscillators 11a and 11b (FIG. 1) are received by detectors 16a and 16b which have wave shaping and threshold circuits in which hysteresis is set to reduce the possibility of adjacent mode oscillations affecting the frequency count and which produce square wave signals of frequency $fa$ and $fb$ respectively. The square wave signals of frequency $fa$ and $fb$ are fed to counters 61a and 61b respectively which are reset to zero and enabled simultaneously by a sequencer 62 at the start of each processing cycle, the sequencer 62 being timed by an accurate and precise reference oscillator 63 and controlled by operator input 64. Simultaneously with counters 61a and 61b, counters 65a and 65b are reset and enabled by sequencer 62 to count a signal fed to them from the reference oscillator 63. The output of the counters 61a and 61b are passed to comparators 66a and 66b respectively to compare against a preset number $\eta$, which is set in the comparator by a microprocessor 67. This number $\eta$ is entered by operator control 64 into the microprocessor 67 and it essentially determines the desired frequency response and velocity resolution. When the output of the counter 61a equals or exceeds $\eta$ the output of the comparator 66a changes state from "low" to "high," and this change of state causes counter 65a to hold. Similarly when the output of the counter 61b equals or exceeds $\eta$ the output of the comparator 66b changes state from "low" to "high", and this change of state causes the counter 65b to hold. The changes of state of comparators 66a and 66b do not, in general, occur at the same time unless the fluid has a zero velocity. When the outputs of both comparator 66a and 66b have attained the "high" state an AND gate 68 is turned on and control is transferred to the sequencer 62 which causes the following sequence of operations: the outputs of counters 65a and 65b are passed to the microprocessor which subtracts a number corresponding to $\tau_s$ corresponding to circuitry time delay and operates on the differences to produce and store, in its output buffer, a measurement of fluid velocity; all counters 61a, 61b, 65a and 65b are then reset to zero and enabled, thus initiating a new measurement cycle. The operations on the differences may consist of an inversion of these differences to yield two frequencies, the difference or beat frequency of which is determined as an accurate measure of the component of velocity along the path of acoustic energy.

The mode of operation described above produces samples of velocity as quickly as is compatible with the resolution requirements implied by the parameter $\eta$ set by the operator input 64. If velocity samples at equal time intervals are required then the microprocessor 67 is programmed to do this and given a number $\eta_\nu$ instead of $\eta$ and the sequencer 62 is turned on by a counter-comparator 69 which receives the number $\eta_\nu$ from the processor 67 and an input from oscillator 63. The frequencies $f_a$ and $f_b$ from detector 16a and 16b will not deviate from their quiescent value $f_o$ by more than $x\%$, and $\eta$ which is fed to comparators 66a and 66b, is selected by the microprocessor 67 so that most of the sampling interval is occupied by measurement i.e. accumulating counts rather than holding while, at the same time $n\eta < \eta_\nu$ such that there is no danger of the sequencer 62 being turned on by the counter/comparator 69 before counters 65a and 65b go into the "hold" mode. In addition, counter comparator 69 is reset by the sequencer 62 at the same time as all of the other counters 61a, 61b, 65a and 65b. In either mode the microprocessor 67 maintains the last velocity sample in its output buffer, from which it may be passed to the data display 18 at any time without interruption of the measuring cycle. The velocity sample may be passed to the data display/memory 18 at the end of each sampling interval or stored for access on demand from the data display/memory 18.

The signal analysis and control circuit in FIG. 7 is similar to the one described with respect to FIG. 6, but has been adapted to process the resonant frequency signals from the single reversing path oscillator 11ab (FIG. 2), which are received by detector 16ab. Detector 16ab includes waveform shapers and threshold detectors with hysteresis set to reduce the possibility of adjacent mode oscillations affecting the frequency count. The output of detector 16ab therefore consists of a succession of square wave signals alternately having a frequency $f_a$ or $f_b$, the duration of the signal at one frequency depending on the path reversal time.

The square wave signal of frequency $f_a$ or $f_b$ is fed to counter 71 which is reset to zero and enabled by sequencer 72 at the start of each processing cycle, the sequencer 72 being timed by an accurate and precise reference oscillator 73 and controlled by operator input 74. Simultaneously with counter 71, counter 75 is reset and enabled by sequencer 72 to count a signal fed to it from the reference oscillator 73. The output of the counter 71 is passed to a comparator 76 to compare against a preset number $\eta$, which is set in the comparator 76 by a microprocessor 77. This number $\eta$ is entered by operator control 74 into microprocessor 77 and it essentially determines the desired frequency response and velocity resolution. When the output of the counter 71 equals or exceeds $\eta$ the output of the comparator 76 changes state from "low" to "high," and this change of state causes counter 75 to hold amd transfer control to the sequencer 72 which causes the following sequence of operation: the path of acoustic energy is reversed by means of the path reversing switch 19, the output of the counter 75 is passed to the microprocessor 77 along with an index telling the microprocessor 77 which of the paths was oscillating during the accumulation of the counts; the microprocessor 77 operates on this count, $N_a$ and the previous count, $N_b$ which it has kept in storage, first subtracting a number corresponding to $\tau_s$, and operates on the differences to produce and store in its output buffer a measurement of fluid velocity; there is a short delay to allow the oscillation of the new path to stabilize; both counters 71 and 75 are reset to zero and enabled, thus initiating a new measurement cycle. The operation on the differences may consist of an inversion of these differences to yield two frequencies, the difference or beat frequency of which is determined as an accurate measure of the component of velocity along the path of acoustic energy.

The mode of operation described above produces samples of velocity as quickly as is compatible with the resolution requirements implied by the parameter $\eta$ set by the operator input 74. If velocity samples at equal time intervals are required, then the microprocessor 77 is programmed to do this and given the number $\eta_\nu$ instead of $\eta$ and the sequencer 72 is turned on by a counter-comparator 78 which receives the number $\eta_\nu$ from processor 77 and input from oscillator 73, instead of the comparator 76. The assumption is made that frequencies $f_a$ and $f_b$ will not deviate from their quiescent value $f_o$ by more than $x\%$, and $\eta$ which is fed to comparator 76 is selected by the microprocessor 77 so that most of the sampling interval is occupied by measurement i.e. accumulating counts rather than holding, while, at the same time $n\eta < \eta_\nu$ such that there is no danger of the sequencer 72 being turned on by the counter/comparator 78 before counter 75 goes into the "hold" mode. In addition counter/comparator 78 is reset by the sequencer 72 at the same time as counter 71 and 75.

In either mode the microprocessor 77 maintains the last velocity sample in its output buffer, from which it may be passed to the data display 18 at any time without interruption of the measuring cycle. The velocity sample may be passed to the data display/memory 18 at the end of each sampling interval or stored for access on demand from the data display/memory 18.

The resolution and frequency response of the measuring device in accordance with this invention are related by an uncertainty principle, giving the operator the opportunity to select optimum capability for a particular application. The uncertainty principle may be derived in terms of the following inequality:

$$F_N \leq \epsilon \frac{n f_o}{\alpha c}$$

$F_N$ = the maximum frequency response or Nyquist frequency;
$\epsilon$ = the velocity resolution in m/sec.
$f_o$ = is the zero flow path frequency;
$n$ = is the ratio of reference oscillator frequency to $f_o$
$c$ = is the velocity of sound of the fluid in m/sec; and
$\alpha = 1$ for the dual path arrangement
$\alpha = 2$ for the single path arrangement. As an example, if a dual path monitor having $nf_o = 10^7$ Hz is required to determine the velocity of a fluid such as water where $c = 1400$ m/s, to an accuracy of 1 cm/sec. the maximum frequency response achievable would be 66.7 Hz. On the other hand, the maximum frequency response for the same monitor determining the velocity of a fluid such as air where $c = 330$ m/s, is approximately 303 Hz. Further, the factor $n$ for circuits in FIGS. 4 and 5 is approximately unity whereas for circuits in FIGS. 6 and 7, $n$ can be much higher thereby giving much better frequency response for a given velocity resolution.

The acoustic phase velocity $c_o$ in any fluid is not constant but varies with environmental conditions such as temperature, pressure, humidity, etc. For a particular application of the measuring device, such as low speed hydrodynamics, the expected variation of the acoustic phase velocity with temperature might be sufficient to cause the acoustic oscillators to switch modes since the frequency $f$ is limited by the characteristics of the transducers and/or the phase locked loop; i.e. $f = f_o \pm \Delta f$ where $f_o$ is the oscillation frequency for a particular set of environmental conditions.

In addition, $$f_o = \frac{m c_o}{l}$$

where $l$ is the path length, and $m$ is the mode number.

Now if $c_o$ should change sufficiently to cause a change in $f_o$ greater than $\Delta f$, the mode number $m$ will spontaneously increase or decrease by one to keep the free acoustic oscillator running. This will produce a sudden change in the apparent sensed velocity which is spurious and hence undesirable.

To avoid this mode number ambiguity, the transmit and receive transducers may be arranged in such a way that the path length $l$ is kept in approximate constant ratio to the ambient acoustic phase velocity $c_o$, making $c_o/l$ approximately constant.

For most applications, such as aerodynamics, most phase velocity variations are negligible, however, for low speed hydrodynamics, phase velocity variations with temperature may be significant.

FIG. 8 illustrates one type of mounting structure 80 for mounting the transducers to compensate for variations with temperature. Structure 80 includes first and second identical arms 81 and 82 mounted on a base 83 having an extension 84 for securing the structure 80 within the flowing liquid. The element 81 to 84 may be constructed as a unit from a metal tubing having a high coefficient of expansion.

Transducers 86 and 87 are mounted facing one another at the ends of arms 81 and 82 to form an acoustic path of length $l$. The leads 88 from the transducers 86 and 87 are passed through the arms 81, 82, the base 83 and out of the extension 84.

A bar 85 having a low coefficient of expansion such as invar, is secured between the arms 81 and 82 such that as the base 83 expands or contracts with temperature change, the path length $l$ between the transducers 86 and 87 will change to maintain the ratio of $c_o/l$ approximately constant.

We claim:

1. A fluid velocity measuring device comprising:
a free running continuous wave acoustic oscillator having a first and second acoustic transducer defining an acoustic path within the fluid and switching means coupled to the first and second transducer to periodically reverse the direction of acoustic energy propagation between the transducers, said acoustic path being the frequency determining element of the oscillator;
means for detecting the output signals of the oscillator as it propagates energy in a first direction in said fluid and in a second direction opposite the said first direction;
up/down counter means having the down terminal coupled to the oscillator signal detecting means;
reference oscillator means coupled to the up terminal of the counter;
switch means for coupling the output of the counter to first and second latching circuit means;
sequencer means for controlling said switch means to store the count from the counter means in said first latch means when the acoustic energy is propagated in a first direction, and in said second latch means when the acoustic energy is propagated in a second direction; and
logic means coupled to the first and second latch means to compute the fluid velocity as a function of the difference of the counts stored in said first and second latch means.

2. A fluid velocity measuring device comprising:
a free running continuous wave acoustic oscillator having a first and second acoustic transducer defining an acoustic path within the fluid and switching means coupled to the first and second transducer to periodically reverse the direction of acoustic energy propagation between the transducers, said acoustic path being the frequency determining element of the oscillator;
means for detecting the output signals of the oscillator as it propagates energy in a first direction in said fluid and in a second direction opposite the said first direction;
a first counter means coupled to the oscillator signal detecting means for providing an output signal after a predetermined count $\eta$;
reference oscillator means having an output frequency which is a multiple of the acoustic oscillator frequency;
second counter means coupled to said reference oscillator means for counting the reference oscillator signal, said second counter means being coupled to said first counter means to hold upon receipt of the output signal from the first counter; and
processor means for receiving sequential counts of said second counter means which represent the period of the oscillator when acoustic energy is propagated in a first direction and in the opposite direction, the processor means further adjusting said counts to compensate for oscillator circuit electronic delay and computing the fluid velocity as a function of the difference of the inverse of the adjusted counts.

3. A fluid velocity measuring device comprising:
a first free running continuous wave acoustic oscillator having a first send and a first receive acoustic transducer for defining a first acoustic path therebetween in the direction of fluid flow, said first acoustic path being the frequency determining element of the first oscillator;
a second free running continuous wave acoustic oscillator having a second send and a second receive acoustic transducer for defining a second acoustic path therebetween in the opposite direction of fluid flow, said second acoustic path being the frequency determining element of the second oscillator;
first means for detecting the output signal of the first oscillator as it propagates energy in the direction of fluid flow;
second means for detecting the output signal of the second oscillator as it propagates energy in the opposite direction of fluid flow;
first and second counter means coupled to the first and second oscillator signal detecting means respectively for providing output signals after a predetermined count $\eta$;
reference oscillator means having an output frequency which is a multiple of the acoustic oscillator frequency;
third and fourth counter means having their inputs coupled to said reference oscillator means, the third counter being coupled to said first counter means to hold upon receipt of the first counter output signal, the fourth counter being coupled to said second counter means to hold upon receipt of the second counter output signal; and
processor means for receiving the counts of said third and fourth counter means, adjusting said counts to compensate for oscillator circuit electronic delays and computing the fluid velocity as a function of the difference of the inverse of the adjusted counts.

* * * * *